United States Patent [19]

Ahlschwede

[11] 4,351,568
[45] Sep. 28, 1982

[54] WHEEL ATTACHING DEVICE

[75] Inventor: Brian A. Ahlschwede, Waterloo, Iowa

[73] Assignee: Deere & Company, Moline, Ill.

[21] Appl. No.: 193,346

[22] Filed: Oct. 2, 1980

[51] Int. Cl.³ .......................................... B60B 11/02
[52] U.S. Cl. .................................. 301/36 R; 301/40 S
[58] Field of Search .......... 301/135 M, 36 R, 36 WP, 301/38 R, 39 R, 40 S, 41 R, 111; 295/121, 8.5; 152/152

[56] References Cited

U.S. PATENT DOCUMENTS

| | | | |
|---|---|---|---|
| 1,948,136 | 2/1934 | Scheckler | 301/36 R |
| 2,067,620 | 1/1937 | Johnston et al. | 301/36 R |
| 2,767,026 | 10/1956 | Walther | 301/13 |
| 3,007,741 | 11/1961 | Brown | 301/13 |
| 3,583,767 | 6/1971 | Unverferth et al. | 301/39 R |
| 3,679,267 | 7/1972 | Zachmann | 301/38 R |
| 3,713,701 | 1/1973 | Penner | 301/39 R |
| 3,840,273 | 10/1974 | Johns | 301/36 R |
| 4,030,753 | 6/1977 | Meinets | 301/36 R |
| 4,220,372 | 9/1980 | Johansen et al. | 301/135 M |

FOREIGN PATENT DOCUMENTS

| | | | |
|---|---|---|---|
| 27027152 | 7/1977 | Fed. Rep. of Germany | 301/41 R |
| 7903783 | 11/1980 | Netherlands | 301/36 R |

*Primary Examiner*—H. Grant Skaggs

[57] ABSTRACT

An attaching mechanism for attaching an auxiliary wheel assembly to an axle-mounted wheel assembly includes a unitary annular disc with a plurality of apertures therein. The disc is fixed to the mounted wheel assembly for rotation therewith and includes a central opening which receives the axle. A hollow central screw member, which receives the axle, is fixed to the auxiliary wheel assembly by a plurality of struts. The struts support pivot members with ends receivable by the apertures in the attaching disc. A nut member is screwed onto the nut member and is engagable with the pivot members to pivot them into and out of interlocking engagement with the bores of the attaching disc.

18 Claims, 3 Drawing Figures

WHEEL ATTACHING DEVICE

BACKGROUND OF THE INVENTION

This invention relates to a device for releasably attaching a pair of vehicle wheel assemblies together.

A number of devices have been designed to releasably attach an auxiliary or outer wheel assembly to an axle-mounted, inner wheel assembly. With some of these devices, a plurality of bolts or levers must be sequentially tightened to form the attachment. In another type of attaching device, five cups are welded to the rim of the inner wheel assembly and five levers are pivotally attached to brackets fixed to the outer wheel assembly. A screw mechanism may then be screwed into a threaded bore to pivot the levers into engagement with the cups. However, this latter device is disadvantaged in that torque is transferred to the outer wheel assembly via the rim of the inner wheel assembly. Another disadvantage is that the outer wheel assembly may have to be rotated up to 36° to align the levers and cups. Another disadvantage of this latter device is that it cannot be used when the inner wheel assembly is mounted on a long rack and pinion-type axle which extends a substantial distance outwardly beyond the inner wheel assembly and through the plane of the auxiliary wheel assembly.

SUMMARY OF THE INVENTION

An advantage of the present invention is that it provides a dual wheel attachment device through which torque may be transmitted between the axle and the outer wheel assembly without the torque being transmitted through the rim of the inner wheel assembly.

A further advantage of this wheel attachment device is that it may be used to attach an outer wheel assembly to an inner wheel assembly where the axle extends through the plane of the outer wheel assembly.

Another advantage of the present invention is that it prevents angular misalignment between the outer and inner wheel assemblies by more than an angle of approximately 5.6 degrees.

Another advantage of the present invention is that it provides for coupling between wheel assemblies by manually rotating a single jackscrew nut member.

These advantages are achieved, according to the present invention, in that it provides a device for quickly and releasably attaching an outer wheel assembly to an axle-mounted, inner wheel assembly. This attaching device includes an attaching disc with a plurality of radially extending tapered bores. The disc is bolted to the cast wheel of the inner wheel assembly in spaced-apart relationship to the rim of the inner wheel assembly. A plurality of support brackets are welded to the rim of the outer wheel assembly and include inner ends fixed to a hollow outside threaded jackscrew member through which extends the axle. A bellcrank is pivotally attached to each of the support brackets. A jackscrew nut member may then be rotated on the hollow jackscrew member to pivot the bellcranks so that their end portions are received in interlocking fashion by the tapered bores in the attaching disc.

DETAILED DESCRIPTION

Figure 1:
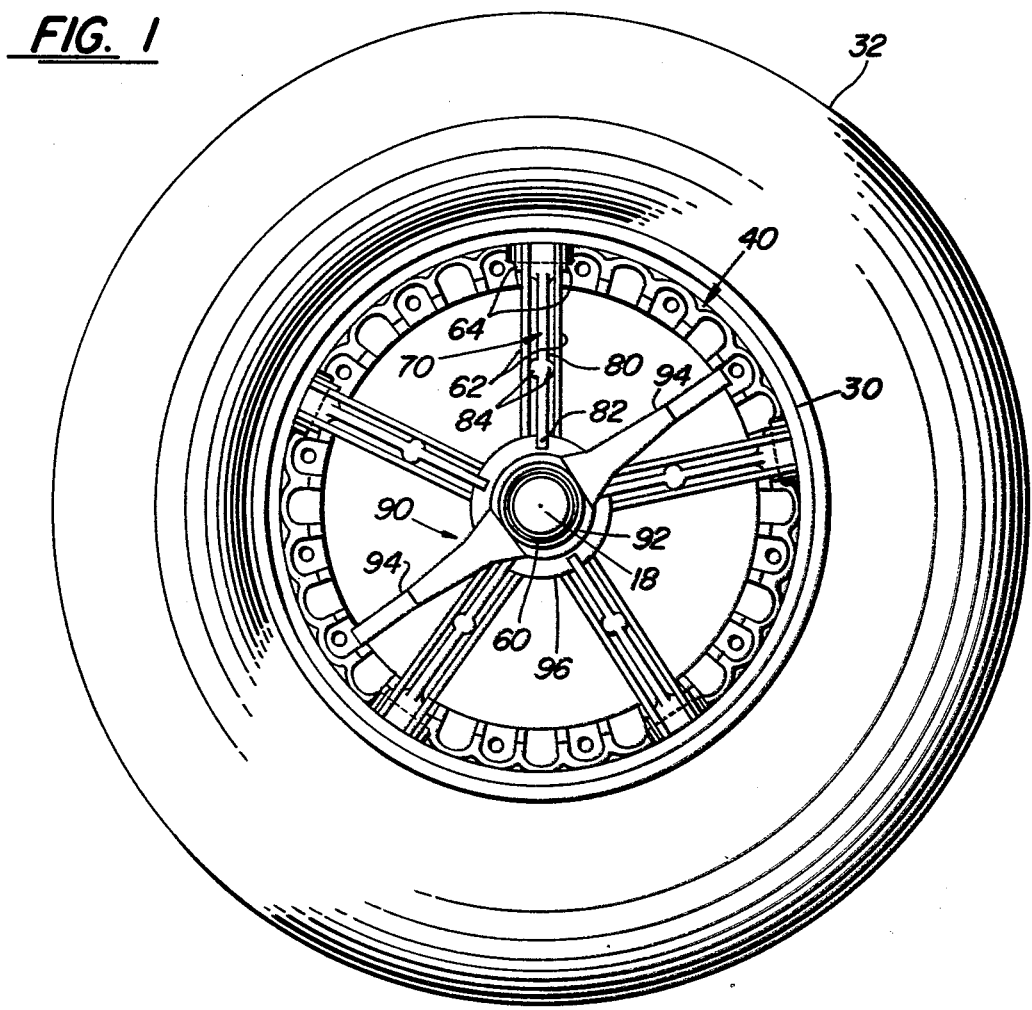
FIG. 1 is a side view of applicant's wheel attaching mechanism.
Figure 3:
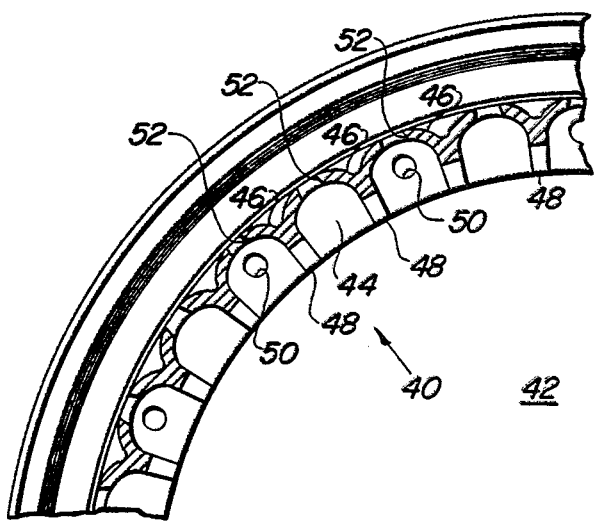
FIG. 3 is a sectional view in the direction of arrow 3 of a portion of the attaching disc of applicant's invention.
Figure 2:
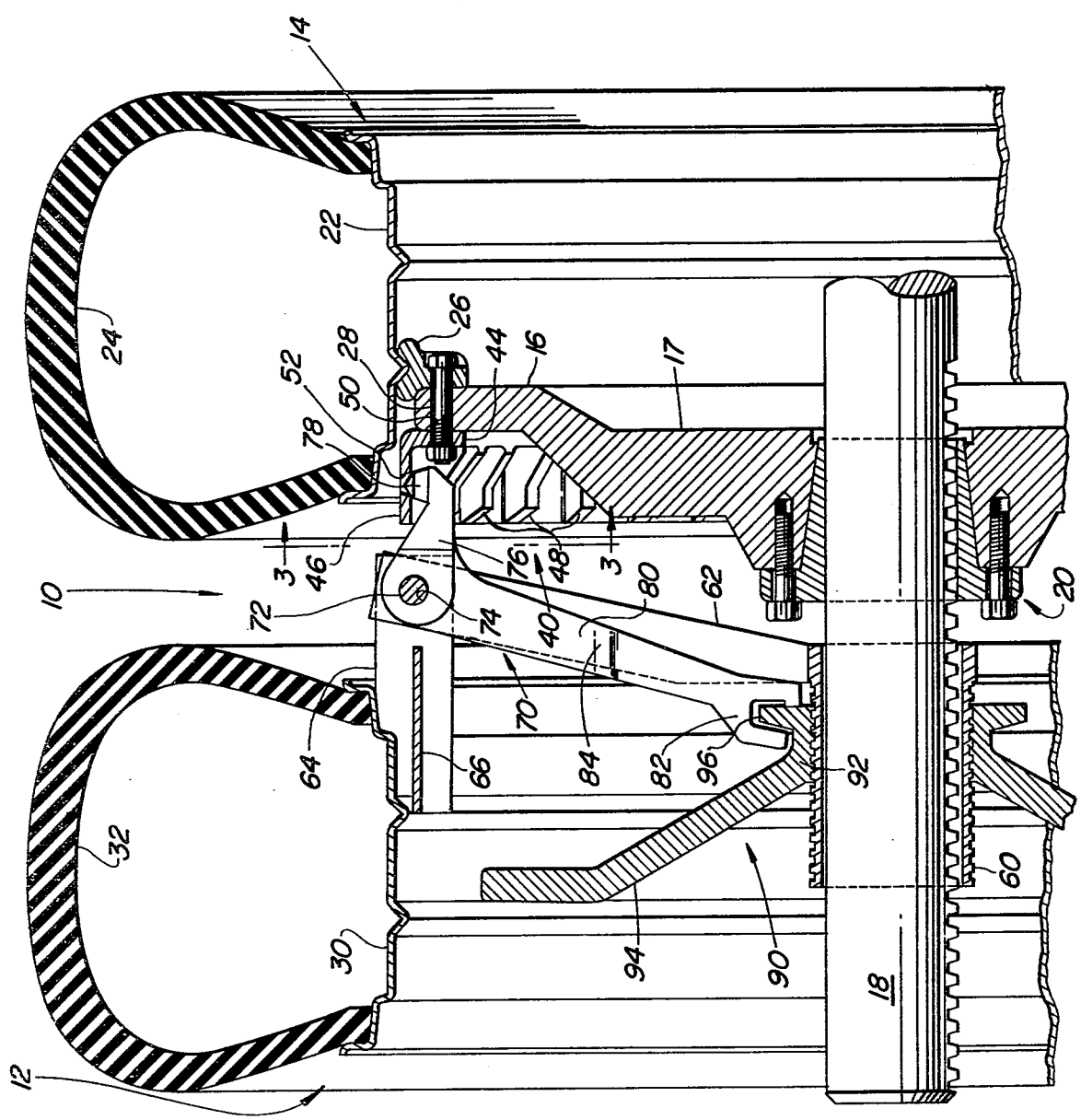
FIG. 2 is a partial sectional view in a direction perpendicular to the axis of the axle.

An attaching mechanism 10 couples an outer or auxiliary wheel assembly 12 to an inner axle-mounted wheel assembly 14. The inner wheel assembly 14 includes a cast wheel 16 with a central hub portion 17 fixed for rotation with a conventional rack and pinion-type axle 18 via a conventional split cone-type connector 20. A rim 22 supports a tire 24 in the conventional manner. The rim 22 is connected to the wheel 16 via sixteen lugs 26 (one of which is shown in FIG. 2) which are bolted to the wheel 16 via bolts 28 (one of which is shown in FIG. 2). The outer wheel assembly 12 includes a conventional rim 30 which supports a tire 32.

The attaching mechanism 10 includes a one-piece or unitary and generally annular-shaped member or attaching disc 40. Disc 40 includes a central opening 42 which receives a hub portion 17 of the wheel 16 and through which extends the axle 18. The disc 40 includes a radially extending portion 44, thirty-two rounded axially extending segments 46 and thirty-two axially and radially extending rib portions 48 which interconnect portions 44 and 46. The portion 44 includes sixteen regularly spaced axial bores 50 extending therethrough for receiving the bolts 28 so that the attaching disc 40 may be fixed to the wheel 16 in coaxial relationship to the axle 18 and in spaced-apart, non-engaging relationship to the rim 22 (as best seen in FIG. 2). Each segment 46 includes a tapered bore 52 extending radially therethrough. Each tapered bore 52 tapers radially outwardly from a larger diameter end to a smaller diameter end.

The attaching mechanism 10 also includes a support structure fixed for rotation with the outer wheel assembly 12. The support structure includes a central hollow outside threaded jackscrew member 60. Member 60 has an inside diameter large enough so that it may coaxially receive the axle 18 in spaced-apart relationship thereto. Five pairs of spaced-apart struts 62 are fixed to an inboard end of the member 60. The pairs of struts 62 extend radially and partially towards the inner wheel assembly 14 to their outer ends. The outer ends of struts 62 are fixed to the inboard ends of substantially axially extending parallel spaced-apart struts 64. The outboard ends of struts 64 are welded or fixed to the rim 30 of the outer or auxiliary wheel assembly 12. A brace 66 interconnects each pair of struts 64 for added rigidity.

A pivot or bellcrank member 70 is pivotally supported between each pair of struts 62 and 64 via a pivot pin 72 which extends through bores in the interconnected end portions of struts 62 and 64. Each pivot member 70 includes a pivot portion with bore 74 for rotatably receiving the pivot pin 72. A first arm 76 extends from the pivot portion and includes a frustoconical end portion 78 for being matingly received by one of the tapered bores 52. A second arm 80 extends substantially radially inwardly and terminates in a bifurcated end portion 82. Each arm 80 also includes a pair of raised shoulder portions 84 which cooperate with the struts 62 to limit lateral movement of the pivot members 70 relative to the struts 62.

The attaching mechanism 10 also includes a coupling or jackscrew nut member 90 threaded on the central jackscrew member 60. The jackscrew nut member 90 includes a hollow cylindrical portion 92. A pair of torque arms 94 extends from the outboard end of cylindrical portion 92. A flange 96 extends radially from the inboard end of cylindrical portion 92 and is received by the bifurcated end portion 82 of pivot member 70. The cylindrical portion 92 also coaxially receives the axle 18, since it is coaxially mounted on the member 60.

MODE OF OPERATION

To attach the outer or auxiliary wheel assembly 12 with the connecting mechanism 10 to the inner or axle-mounted wheel assembly 14, the nut member 90 is rotated on the screw member 60 toward the outboard end thereof to pivot the pivot members 70 so that their frustoconical ends 78 are pivoted radially inwardly to clear flange portion 46 of attaching disc 40. Wheel assembly 12 is then coaxially positioned on the axle 18 and moved inboard towards the inner wheel assembly 14 until the frustoconical ends 78 of pivots 70 are aligned with the tapered bores 52. Since the 32 tapered bores are evenly angularly spaced apart by no more than 11.25 degrees, the wheel assembly 12 will not have to be rotated by more than half this amount, or 5.625 degrees, to align the ends 78 with the tapered bores 52.

The vehicle operator then rotates nut member 90 towards the inboard end of screw member 60 to pivot the pivot members 70 until their frustoconical ends 72 are securely engaged with the walls of the tapered bores 52. In this position, the connecting mechanism 10 holds the central jackscrew member 60 in coaxially spaced-apart relationship to the axle 18.

When torque is applied to the axle 18 from the vehicle transmission (not shown) this torque is transmitted to the rim 30 of the outer wheel assembly 12 via the cast wheel 16, the bolts 28, attaching disc 40, pivots 70 and struts 62 and 64. Thus, the torque transmitted between the axle 18 and the outer wheel assembly 12 is not transmitted via the rim 22 of the inner wheel assembly 14. This prevents undue torque loads from damaging the rim 22 of the inner wheel assembly 14.

To remove the outer wheel assembly 12 from the inner wheel assembly, the jackscrew nut 90 is rotated on the jackscrew member 60 back towards its outboard end to pivot the pivots 70 to withdraw their ends 78 from the bores 52. The outer wheel assembly 12 may then be pulled axially away from the inner wheel assembly 14 and removed from the axle 18.

I claim:

1. An attaching device for attaching an auxiliary wheel assembly to a vehicle-mounted wheel assembly, the mounted wheel assembly having a wheel fixed for rotation with an axle and a rim attached to the wheel for supporting a tire thereupon, the attaching device comprising:
   support structure fixed for rotation with the auxiliary wheel assembly, the support structure comprising a hollow cylindrical member defining an axial bore therein for receiving the axle and a plurality of support members interconnecting the cylindrical member and the auxiliary wheel assembly;
   a disc member attached to the wheel of the mounted wheel assembly for rotation therewith;
   a plurality of pivot members each pivotally attached to a corresponding one of the support members and each with a disc-engaging portion; and
   a coupling member mounted on an outer surface of the cylindrical member and engagable with the pivot members, the coupling member being movable with respect to the cylindrical member to pivot the disc-engaging portions of the pivot members into interlocking engagement with the disc member, the interlocked disc and pivot members and the support structure cooperating to cause the mounted and auxiliary wheel assemblies to rotate together.

2. The attaching device of claim 1, wherein:
   the axial bore in the cylindrical member has a diameter which is larger than the diameter of the axle so that the interlocked disc and pivot members and the support structure cooperate to maintain the cylindrical member in spaced-apart coaxial relationship to the axle.

3. The attaching device of claim 1, wherein:
   the coupling member includes an inside threaded hollow cylindrical portion and the cylindrical member includes an outside threaded portion threadably received by the coupling member.

4. The attaching device of claim 1, wherein:
   the coupling member includes a radially extending flange and each pivot member includes a bifurcated end portion receiving the flange.

5. The attaching device of claim 1, wherein each support member comprises:
   a generally radially extending strut with an inner end fixed to the cylindrical member and with an outer end; and
   a generally axially extending arm with a first end fixed to a rim of the auxiliary wheel assembly and with a second end fixed to the outer end of the strut.

6. In a dual wheel assembly comprising:
   an axle-mounted wheel assembly;
   an auxiliary wheel assembly;
   support structure fixed for rotation with the auxiliary wheel assembly, the support structure comprising a central member having an axially extending bore therewithin for receiving a portion of the axle, the support structure further comprising a plurality of support members rigidly interconnecting the central member and the auxiliary wheel assembly; and
   connecting means for releasably interconnecting the support structure and the mounted wheel assembly, the connecting means comprising a plurality of pivot members, each pivot member being pivotally supported by a corresponding one of the support members, each pivot member including a first end engageable with the mounted wheel assembly and a second end, and a coupling member mounted on an outer surface of the central member and engageable with the second end of the pivot member, the coupling member being movable with respect to the central member to pivot the pivot members into and out of interlocking engagement with the mounted wheel assembly.

7. An attaching device for attaching an auxiliary wheel assembly to a vehicle-mounted wheel assembly, the mounted wheel assembly having a wheel fixed for rotation with an axle and a rim attached to the wheel for supporting a tire thereupon, the attaching device comprising:
   support structure fixed for rotation with the auxiliary wheel assembly, the support structure comprising a hollow cylindrical member defining an axial bore therein for receiving the axle and a plurality of support members interconnecting the cylindrical member and the auxiliary wheel assembly;

a disc member attached to the wheel of the mounted wheel assembly for rotation therewith;

a plurality of pivot members each pivotally attached to a corresponding one of the support members and each with a disc-engaging portion; and a coupling member mounted on the cylindrical member and engageable with the pivot members, the coupling member being movable with respect to the cylindrical member to pivot the disc-engaging portions of the pivot members into interlocking engagement with the disc member, the interlocked disc and pivot members and the support structure cooperating to cause the mounted and auxiliary wheel assemblies to rotate together, the coupling member including an inside threaded hollow cylindrical portion and the cylindrical member including an outside threaded portion threadably received by the coupling member.

8. An attaching device for attaching an auxiliary wheel assembly to a vehicle-mounted wheel assembly, the mounted wheel assembly having a wheel fixed for rotation with an axle and a rim attached to the wheel for supporting a tire thereupon, the attaching device comprising:

support structure fixed for rotation with the auxiliary wheel assembly, the support structure comprising a hollow cylindrical member defining an axial bore therein for receiving the axle and a plurality of support members interconnecting the cylindrical member and the auxiliary wheel assembly, each support member comprising a generally radially extending strut with an inner end fixed to the cylindrical member and with an outer end, and a generally axially extending arm having a first end fixed to a rim of the auxiliary wheel assembly and having a second end fixed to the outer end of the strut;

a disc member attached to the wheel of the mounted wheel assembly for rotation therewith;

a plurality of pivot members each pivotally attached to a corresponding one of the support members and each with a disc-engaging portion; and a coupling member mounted on the cylindrical member and engageable with the pivot members, the coupling member being movable with respect to the cylindrical member to pivot the disc-engaging portions of the pivot members into interlocking engagement with the disc member, the interlocked disc and pivot members and the support structure cooperating to cause the mounted and auxiliary wheel assemblies to rotate together.

9. The invention of claim 8, wherein the bore in the central member has a diameter which is larger than the axle diameter so that the support structure and the connecting means cooperate to hold the central member in coaxially spaced-apart relationship to the axle.

10. The invention of claim 8, wherein the connecting means comprises:

a generally annular-shaped member axially aligned with the mounted wheel and with a plurality of apertures formed therein;

a plurality of pivot members pivotally supported by the support structure, each pivot member including a first end for insertion into a corresponding one of the apertures and a second end; and a coupling member mounted on the central member and engageable with the second end, the coupling member being movable with respect to the central member to pivot the first ends of the pivot members into and out of the apertures in the annular-shaped member.

11. The invention of claim 10, wherein the annular-shaped member is comprised of a single unitary structure.

12. The invention of claim 10, wherein:

the annular-shaped member includes a central opening for receiving the axle.

13. The invention of claim 10, wherein:

the annular-shaped member comprises a radially extending annular disc portion and a flange portion extending generally axially from the disc portion, the apertures being comprised of bores extending radially through the flange portion.

14. The invention of claim 13, wherein:

the first end of each pivot member defines a frusto-conical surface and each aperture is comprised of a tapered bore with a wall engageable with the frustoconical surface.

15. The invention of claim 13, wherein:

the annular-shaped member further comprises a plurality of rib portions interconnecting the disc and flange portions to maintain a predetermined relationship therebetween.

16. The invention of claim 10, wherein:

the annular-shaped member is fixed to the wheel in spaced-apart relationship to the rim of the mounted wheel assembly.

17. The invention of claim 10, wherein:

the annular-shaped member further comprises a plurality of axially and radially extending rib portions disposed between adjacent pairs of the apertures.

18. A dual wheel assembly comprising:

an axle-mounted wheel assembly;

an auxiliary wheel assembly;

support structure fixed for rotation with the auxiliary wheel assembly, the support structure comprising a central member having an axially extending bore therewithin for receiving a portion of the axle; and connecing means for releasably interconnecting the support structure and the mounted wheel assembly, the connecting means comprising a generally annular-shaped member fixed to the wheel in spaced-apart relationship to the rim of the mounted wheel assembly and axially aligned with the mounted wheel and with a plurality of apertures formed therein, a plurality of pivot members pivotally supported by the support structure, each pivot member including a first end for insertion into a corresponding one of the apertures and a second end, and a coupling member mounted on the central member and engageable with the second end, the coupling member being movable with respect to the central member to pivot the first ends of the pivot members into and out of the apertures in the annular-shaped member.

* * * * *